(12) United States Patent
Timken et al.

(10) Patent No.: US 8,487,154 B2
(45) Date of Patent: *Jul. 16, 2013

(54) MARKET DRIVEN ALKYLATION OR OLIGOMERIZATION PROCESS

(75) Inventors: Hye-Kyung Timken, Albany, CA (US); Shawn Winter, Salt Lake City, UT (US); Howard S. Lacheen, Richmond, CA (US); Sven Ivar Hommeltoft, Pleasant Hill, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 730 days.

This patent is subject to a terminal disclaimer.

(21) Appl. No.: 12/726,009

(22) Filed: Mar. 17, 2010

(65) Prior Publication Data

US 2011/0226669 A1  Sep. 22, 2011

(51) Int. Cl.
*C10G 57/00* (2006.01)
(52) U.S. Cl.
USPC ........... 585/709; 585/708; 585/700; 585/302; 585/500; 585/643; 585/712; 585/727; 585/710
(58) Field of Classification Search
USPC ............. 585/709, 712, 721, 727, 728, 729, 585/741, 742, 743, 747, 746, 302, 6, 4, 14, 585/500, 643, 800, 802, 645; 208/133
See application file for complete search history.

(56) References Cited

U.S. PATENT DOCUMENTS

| | | | |
|---|---|---|---|
| 7,432,408 B2 | 10/2008 | Timken et al. | |
| 7,432,409 B2 | 10/2008 | Elomari et al. | |
| 7,495,144 B2 | 2/2009 | Elomari | |
| 7,553,999 B2 | 6/2009 | Elomari et al. | |
| 7,569,740 B2 | 8/2009 | Elomari | |
| 7,572,943 B2 | 8/2009 | Elomari et al. | |
| 7,572,944 B2 | 8/2009 | Elomari et al. | |
| 7,576,252 B2 | 8/2009 | Elomari et al. | |
| 2006/0131209 A1* | 6/2006 | Timken et al. | 208/16 |
| 2007/0142690 A1* | 6/2007 | Elomari | 585/727 |
| 2007/0249486 A1* | 10/2007 | Elomari et al. | 502/53 |
| 2008/0161623 A1* | 7/2008 | Hope et al. | 585/506 |
| 2009/0107032 A1 | 4/2009 | Lacheen et al. | |
| 2009/0270666 A1 | 10/2009 | Elomari et al. | |
| 2009/0270667 A1 | 10/2009 | Elomari et al. | |
| 2009/0306444 A1 | 12/2009 | Elomari et al. | |
| 2010/0025292 A1 | 2/2010 | Hommeltoft et al. | |
| 2010/0025296 A1 | 2/2010 | Hommeltoft | |

OTHER PUBLICATIONS

U.S. Appl. No. 12/538,746, filed Aug. 10, 2009, Elomari, et al.

(Continued)

*Primary Examiner* — In Suk Bullock
*Assistant Examiner* — Sharon Pregler
(74) *Attorney, Agent, or Firm* — Susan M. Abernathy

(57) ABSTRACT

A process comprising adjusting a level of conjunct polymers in an ionic liquid catalyst between a low level that favors production of $C_5+$ products boiling at 137.8° C. or below and a higher level that favors production of both $C_5+$ products boiling at 137.8° C. or below and $C_5+$ products boiling above 137.8° C.; wherein the adjusting is done in response to market demand. A process unit, comprising a reactor that operates with an ionic liquid catalyst comprising a low level or a higher level of conjunct polymers, and the alkylation reactor is switched between operating with the low and the higher levels in response to market demand. A process unit, comprising a reactor that operates in an alkylate mode and a distillate mode, and a catalyst regenerator that operates with varying severity to adjust the level of conjunct polymers in response to demand for gasoline or distillate.

10 Claims, 1 Drawing Sheet

Flexible Production of Alkylate Gasoline and Distillate with Ionic Liquid Catalyst

OTHER PUBLICATIONS

U.S. Appl. No. 12/233,481, filed Sep. 18, 2008, Hommeltoft.
U.S. Appl. No. 12/335,476, filed Dec. 15, 2008, Hommeltoft, et al.
U.S. Appl. No. 12/335,487, filed Dec. 15, 2008, Lacheen, et al.
U.S. Appl. No. 12/538,738, filed Aug. 2009, Saleh.
U.S. Appl. No. 12/610,010, filed Oct. 30, 2009, O'Rear, et al.
U.S. Appl. No. 12/468,750, filed May 19, 2009, Hommeltoft.

* cited by examiner

Flexible Production of Alkylate Gasoline and Distillate with Ionic Liquid Catalyst
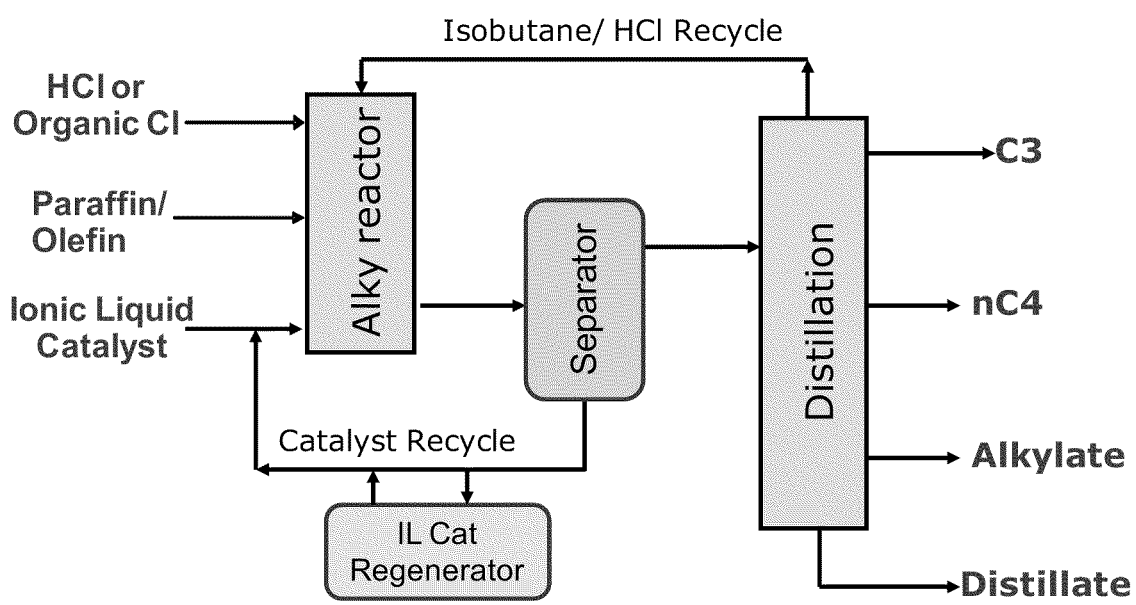

MARKET DRIVEN ALKYLATION OR OLIGOMERIZATION PROCESS

This application is related to two co-filed patent applications, titled "FLEXIBLE PRODUCTION OF ALKYLATE GASOLINE AND DISTILLATE" and "PROCESS FOR PRODUCING HIGH QUALITY GASOLINE BLENDING COMPONENTS IN TWO MODES," herein incorporated in their entireties.

FIELD OF THE INVENTION

This application is directed to processes for making hydrocarbon products by adjusting conjunct polymers in an ionic liquid catalyst in response to a market demand for different hydrocarbon products.

SUMMARY OF THE INVENTION

This application provides a process for making hydrocarbon products, comprising: adjusting a level of one or more conjunct polymers in an acidic ionic liquid catalyst between a low level that favors a production of $C_5+$ products boiling at 280° F. (137.8 degree Celsius) or below and a higher level that favors a production of both $C_5+$ products boiling at 280° F. (137.8 degree Celsius) or below and $C_5+$ products boiling above 280° F. (137.8 degree Celsius); wherein the adjusting is done in response to a market demand for different hydrocarbon products.

This application provides a process unit, comprising:
a) an alkylation reactor that operates with:
i. an ionic liquid catalyst comprising a low level of one or more conjunct polymers, to favor a production of $C_5+$ products boiling at 280° F. (137.8 degree Celsius) or below; or
ii. an ionic liquid catalyst comprising a higher level of one or more conjunct polymers, that produces both $C_5+$ products boiling at 280° F. (137.8 degree Celsius) or below and $C_5+$ products boiling above 280° F. (137.8 degree Celsius); and
b) the alkylation reactor is switched between operating with the low level of one or more conjunct polymers and the higher level of one or more conjunct polymers in response to a market demand for different hydrocarbon products.

This application also provides a process unit, comprising a reactor that operates in an alkylate mode and a distillate mode, and a catalyst regenerator connected to the reactor that operates with varying severity to adjust a level of conjunct polymers in an ionic liquid catalyst in response to demand for gasoline or distillate.

BRIEF DESCRIPTION OF THE DRAWINGS

FIG. 1 is a process flow diagram of an embodiment showing flexible production of alkylate gasoline and distillate with an ionic liquid catalyst.

DETAILED DESCRIPTION OF THE INVENTION

Even when crude oil prices are stable, gasoline prices fluctuate due to seasonal demand, refinery shut-downs, and local retail station competition. Gasoline prices can change rapidly when something disrupts the supply of crude oil or if there are problems at refineries, with delivery pipelines, with regional transport, or with highways.

Retail gasoline prices tend to gradually rise in the spring and peak in late summer when people drive more, and then drop in the winter. Good weather and vacations cause summer gasoline demand in the United States, for example, to average about 5% higher than during the rest of the year. Gasoline formulations and specifications also change seasonally. Environmental regulations require that gasoline sold in the summer be less prone to evaporate during warmer weather. This means that refiners must replace cheaper but more evaporative gasoline blending components with more expensive gasoline blending components having low volatility. If crude oil prices do not change, gasoline prices typically increase by 5-50 cents per gallon from January to the summer. It is desired that refining processes be able to respond to changing market demands.

The level of one or more conjunct polymers in the acidic ionic liquid catalyst is adjusted to a low level to favor production of $C_5+$ products boiling at 280° F. (137.8 degree Celsius) or below. This can be referred to as an "alkylate mode." The low level, for example, can be less than 20 wt %, less than 15 wt %, 10 wt % or less, from 5 wt % to 10 wt %, from 0 to 15 wt %, or from 0 to 10 wt %. The term conjunct polymer was first used by Pines and Ipatieff to distinguish these polymeric molecules from the usual polymers. Unlike typical polymers, conjunct polymers are polyunsaturated cyclic, polycyclic and acyclic molecules formed by concurrent acid-catalyzed reactions including, among others, polymerization, alkylation, cyclization, and hydride transfer reactions. Conjunct polymers consist of an unsaturated intricate network of molecules that can include one or a combination of 4-, 5-, 6- and 7-membered rings and some aromatic entities in their skeletons. Some examples of the likely polymeric species were reported by Miron et al. (Journal of Chemical and Engineering Data, 1963) and Pines (Chem. Tech, 1982), which documents are incorporated by reference in their entirety herein. These molecules contain double and conjugated bonds in intricate structures containing a combination of cyclic and acyclic skeletons.

In practice, conjunct polymers are also called "red oils" due to their color and "acid-soluble oils" due to their high uptake in the catalyst phase where saturated hydrocarbons and paraffinic products are usually immiscible.

The level of one or more conjunct polymers in the acidic ionic liquid catalyst is adjusted to a higher level that favors the production of both $C_5+$ products boiling at 280° F. (137.8 degree Celsius) or below and $C_5+$ products boiling above 280° F. (137.8 degree Celsius). This can be referred to as a "distillate mode." A higher level is a level greater than the low level that is used to favor the production of $C_5+$ products boiling at 280° F. (137.8 degree Celsius) or below. For example, the higher level can be above 5 wt %, greater than 10 wt %, about 15 wt % or higher, about 20 wt % or higher, above 30 wt %, or above 40 wt %. The level can be adjusted back and forth from the low level to the high level to switch from operating in either the alkylate mode or the distillate mode; wherein the adjusting is done in response to a market demand for different hydrocarbon products.

In one embodiment the process unit comprises:
a. an alkylation reactor, an oligomerization reactor, or a combined alkylation and oligomerization reactor that operates with:
i. an ionic liquid catalyst comprising a low level of conjunct polymers in an alkylate mode;
ii. an ionic liquid catalyst comprising a higher level of conjunct polymers in a distillate mode; and
b. an ionic liquid catalyst regenerator connected to the reactor that operates with varying severity to adjust the level of conjunct polymers in the ionic liquid catalyst in response to a market demand for an alkylate gasoline blending component or a distillate.

Additionally, the process can additionally comprise controlling a level of a halide containing additive (e.g., HCl) in an alkylation reactor comprising the acidic ionic liquid catalyst, controlling a molar ratio of isoparaffin to olefin in the alkylation reactor comprising the acidic ionic liquid catalyst, changing a reaction temperature in an alkylation reactor comprising the acidic ionic liquid catalysts, or combinations thereof.

In one embodiment the level of the halide containing additive is adjusted upward to boost the overall acidity of conditions in the process unit to increase the total wt % of the $C_5+$ hydrocarbons. The halide containing additive can be a hydrogen halide, an organic halide, and combinations thereof. In one embodiment, the halide containing additive can be a Bronsted acid, for example, HCl, HBr, and trifluoromethanesulfonic acid. Adjusting and controlling the level of the halide containing additive can be used to switch back and forth between operating in the alkylate mode and the distillate mode. By adjusting the level of the halide containing additive to a lower level a higher level of $C_5+$ hydrocarbons in the process unit boil above 280° F. (137.8 degree Celsius). By adjusting the level of the halide containing additive to a higher level a higher level of $C_5+$ hydrocarbons in the process unit boil at 280° F. (137.8 degree Celsius) or below. The level of the halide containing additive can be adjusted by varying the molar ratio of an olefin to the halide containing additive in a feed to the process unit. Processes for adjusting the level of a halide containing additive to shift selectivity towards heavier products is taught in US Patent Publication Number US20100025292.

Additionally, the process can additionally comprise controlling a molar ratio of isoparaffin to olefin in a feed to a reactor operating with the ionic liquid catalyst. In general, lowering the molar ratio of isoparaffin to olefin in the feed will produce a higher level of $C_5+$ hydrocarbons in the process unit that boil above 280° F. (137.8 degree Celsius). In one embodiment, the molar ratio of isoparaffin to olefin in the feed while operating the process unit in the alkylate mode is from 4:1 to 100:1, such as from 4:1 to 50:1, or from 4:1 to 20:1; and the molar ratio of isoparaffin to olefin in the feed while operating the process unit in the distillate mode is a lower molar ratio from that used during the alkylate mode, from 0.25:1 to 25:1, such as from 0.25:1 to 20:1, or 0.25:1 to 10:1. In a different embodiment the molar ratio of isoparaffin to olefin in the feed is approximately the same while operating in both the alkylate mode and the distillate mode.

In another embodiment, the adjusting can additionally include changing the reaction temperature. In general, increasing the reaction temperature will produce a higher level of $C_5+$ hydrocarbons in the process unit that boil above 280° F. (137.8 degree Celsius). In one embodiment, the reaction temperature while operating the process unit in the alkylate mode is from −40° C. to 100° C.; and the reaction temperature while operating the process unit in the distillate mode is a higher temperature, from 0° C. to 200° C. In a different embodiment the reaction temperature is approximately the same while operating in both the alkylate mode and the distillate mode.

The process can additionally comprise adjusting one or more process conditions in the process unit after operating in the distillate mode to return to operating the process unit in the alkylate mode. This can be advantageous when there is a shift in market demand, or an increased value for products produced during one of the modes. In one embodiment the market demand is a seasonal need for an increased amount of an alkylate gasoline blending component.

In one embodiment the hydrocarbons produced by the process unit are selected from the group consisting of gasoline blending component, light distillate, heavy distillate, lubricating oil, and combinations thereof. In one embodiment, the process unit produces a gasoline blending component, a light distillate, and a heavy distillate when the reactor is operated in the distillate mode.

A "gasoline blending component" can be either a gasoline or a naphtha hydrocarbon product suitable for blending into a gasoline. "Gasoline" is a liquid hydrocarbon used as a fuel in internal combustion engines. In the context of this disclosure, "distillate" is a liquid hydrocarbon having a boiling range from about 280° F. and higher. It can comprise one or both of "light distillate" and "heavy distillate." "Light distillate" is a liquid hydrocarbon having a boiling range from about 280° F. to about 500° F., and "heavy distillate" is a liquid hydrocarbon having a boiling range from about 500° F. and higher. The boiling range is the 10 vol % boiling to the final boiling point (99.5 vol %), inclusive of the end points, as measured by ASTM D2887-06a and ASTM D 6352-04. A "lubricating oil" is a liquid hydrocarbon having a kinematic viscosity at 100 degrees Celsius of about 1.8 $mm^2/s$ or higher that is useful in the formulation of finished lubricants, such as engine oils, industrial oils, greases, gear oils, etc.

In one embodiment the $C_5+$ products boiling above 280° F. (137.8 degree Celsius) comprise a light distillate and a heavy distillate. The $C_5+$ products boiling above 280° F. (137.8 degree Celsius) can be of excellent quality, having low cloud points and low sulfur. The cloud points, for example can be less than −35° C., less than −40° C., less than −45° C., less than −50° C., or less than −51° C. The sulfur, can be less than 50 wppm, less than 30 wppm, less than 20 wppm, or less than 10 wppm. In one embodiment both the light distillate and the heavy distillate have a cloud point less than −40° F. (−40 degree Celsius), less than −50° F. (−46 degree Celsius) or less than −60° F. (−51 degree Celsius). In one embodiment the light distillate and the heavy distillate have less than 30 wppm sulfur, less than 20 wppm sulfur, or less than 10 wppm sulfur. In other embodiments, $C_5+$ products produced in both the alkylate mode and the distillate mode have low sulfur, such as less than 25 wppm, less than 20 wppm, less than 10 wppm, or less than 5 wppm.

The adjusting the level of one or more conjunct polymers to the higher level is done, for example, by a) lowering a withdrawal rate of the acidic ionic liquid catalyst from a reactor selected from the group of an alkylation reactor, an oligomerization reactor, or an alkylation/oligomerization reactor, b) lowering a severity of an ionic liquid catalyst regenerator, or c) a combination thereof.

Examples of suitable reactors for performing alkylation, oligomerization or combined alkylation and oligomerization are described in the following US Patent Publications: US20090306444, US20090166257, US20090171134, US20090171133, US20090107032, and US20100025296.

Examples of processes and reactors for regenerating catalysts by removing conjunct polymers from used acidic ionic liquid catalysts are described, for example, in the following patent publications: US20070142217A1, US 2007014267A1, US20070142213A1, US 20070142211A1, US 20070142215A1, US 20070141221 8A1, US 20070142216A1, US 20070249485A1, US 20090253572A1, US 20090170687A1, and US 20090170688A1; and U.S. Pat. No. 7,651,970. The ionic liquid catalyst regenerator, for example, can comprise a reactive extraction column, the reactive extraction column comprising:

(a) an upper feed port, wherein a slurry of an ionic liquid catalyst and an aluminum metal enter the reactive extraction column;

(b) a lower feed port, wherein a solvent and optionally a hydrogen gas enter the reactive extraction column;

(c) a moveable bed comprised of the aluminum metal between the upper and lower feed ports, wherein the ionic liquid catalyst and the aluminum metal reacts to free conjunct polymers from the ionic liquid catalyst and some of the freed conjunct polymers are extracted from the ionic liquid catalyst by the solvent to provide regenerated ionic liquid catalyst;

(d) a lower exit port, wherein the regenerated ionic liquid catalyst exits the reactive extraction column; and (e) an upper exit port, wherein the solvent and freed conjunct polymers exit the reactive extraction column Ionic liquid catalyst regenerators having this design are described in US Patent Publication Number US20090170687A1.

The process unit comprises a reactor that operates with an ionic liquid catalyst comprising a low level of conjunct polymers in an alkylate mode and with a higher level of conjunct polymers in a distillate mode. One technical advantage of this process unit is that it can be switched between the two modes very quickly. For example, the reactor can switch back and forth between the two modes within a month, within two weeks or less, within one week or less, within 5 days or less, within 4 days or less, within 3 days or less, within 2 days or less, or within 1 day or less.

In one embodiment, the process unit additionally comprises a control system that controls variables that influence the production of either $C_5+$ products boiling at 280° F. (137.8 degree Celsius) or below or both $C_5+$ products boiling a 280° F. (137.8 degree Celsius) or below and $C_5+$ products boiling above 280° F. (137.8 degree Celsius). In one embodiment the control system in the process unit comprises an ionic liquid catalyst regenerator, connected to the reactor, which controls the level of the conjunct polymer in the ionic liquid catalyst.

In one embodiment, the process unit additionally comprises a control system that controls the level of a halide containing additive. In one embodiment the process unit comprises an HCl recycle stream from a distillation column back to the reactor. In one embodiment, the level of the halide containing additive is controlled by control system that a) strips or distills a hydrocarbon effluent from a reactor comprising an ionic liquid catalyst into a first fraction having at least 5 wt % of a hydrogen halide and a second fraction having less than 25 wppm of the hydrogen halide; and b) recycles at least a portion of the first fraction to the reactor to improve the selectivity of the products from the reactor to alkylate gasoline or distillate. In another embodiment, the control system that enables the alkylation reactor to operate in both an alkylate mode or a distillate mode receives information from an on-line HCl analyzer that measures the chloride content in an off-gas. The control system communicates changes to the operating conditions to maintain the chloride level in a predetermined range. Examples of how on-line HCl analyzers can be used in this process unit are described in U.S. patent application Ser. No. 12/233,481, filed on Sep. 18, 2008.

In one embodiment the operating of the process unit in an alkylate mode comprises alkylating using an acidic ionic liquid catalyst. Examples of alkylation processes for making alkylate gasoline with low volatility and high octane number are described in U.S. Pat. No. 7,432,408 and US Patent Publication Number US20100025292. Other processes for alkylating using an acidic ionic liquid catalyst are described in U.S. Pat. Nos. 7,432,409; 7,495,144; 7,553,999; US Patent Publication Numbers US20090107032 and US20100025296; and patent application Ser. Nos. 12/335,476 and 12/335,487, both filed on Dec. 15, 2008.

In another embodiment, the operating of the process unit in a distillate mode comprises alkylating and oligomerizing using an acidic ionic liquid catalyst. Examples of processes to make higher boiling hydrocarbons are described in U.S. Pat. Nos. 7,572,943; 7,569,740; 7,576,252; 7,572,944; and US Patent Publication Numbers US20090306444, US 20090270667, US20090270666, and US20100025292; U.S. patent application Ser. No. 12/233,481, filed on Sep. 18, 2008, Ser. No. 12/538,738, filed on Aug. 10, 2009, Ser. No. 12/538,746, filed Aug. 10, 2009, and Ser. No. 12/610,010, filed Oct. 30, 2009.

The ionic liquid catalyst used in the operating of the process unit in the alkylate mode can be the same or different from the ionic liquid catalyst used in the operating of the process unit in the distillate mode. The ionic liquid catalyst is composed of at least two components which form a complex. The ionic liquid catalyst comprises a first component and a second component. The first component of the ionic liquid catalyst can comprise a Lewis Acid selected from components such as Lewis Acidic compounds of Group 13 metals, including aluminum halides, alkyl aluminum halide, gallium halide, and alkyl gallium halide (see International Union of Pure and Applied Chemistry (IUPAC), version 3, October 2005, for Group 13 metals of the periodic table). Other Lewis Acidic compounds, in addition to those of Group 13 metals, can also be used. In one embodiment the first component is aluminum halide or alkyl aluminum halide. For example, aluminum trichloride can be the first component of the acidic ionic liquid catalyst.

The second component making up the ionic liquid catalyst is an organic salt or mixture of salts. These salts can be characterized by the general formula Q+A−, wherein Q+ is an ammonium, phosphonium, boronium, iodonium, or sulfonium cation and A− is a negatively charged ion such as $Cl^-$, $Br^-$, $ClO_4^-$, $NO_3^-$, $BF_4^-$, $BCl_4^-$, $PF_6^-$, $SbF_6^-$, $AlCl_4^-$, $TaF_6^-$, $CuCl_2^-$, $FeCl_3^-$, $HSO_3^-$, $RSO_3^-$, $SO_3CF_3^-$, and 3-sulfurtrioxyphenyl. In one embodiment the second component is selected from those having quaternary ammonium halides containing one or more alkyl moieties having from about 1 to about 12 carbon atoms, such as, for example, trimethylamine hydrochloride, methyltributylammonium halide, or substituted heterocyclic ammonium halide compounds, such as hydrocarbyl substituted pyridinium halide compounds for example 1-butylpyridinium halide, benzylpyridinium halide, or hydrocarbyl substituted imidazolium halides, such as for example, 1-ethyl-3-methyl-imidazolium chloride.

In one embodiment the ionic liquid catalyst is selected from the group consisting of hydrocarbyl substituted pyridinium chloroaluminate, hydrocarbyl substituted imidazolium chloroaluminate, quaternary amine chloroaluminate, trialkyl amine hydrogen chloride chloroaluminate, alkyl pyridine hydrogen chloride chloroaluminate, and mixtures thereof. For example, the ionic liquid catalyst can be an acidic haloaluminate ionic liquid, such as an alkyl substituted pyridinium chloroaluminate or an alkyl substituted imidazolium chloroaluminate of the general formulas A and B, respectively.

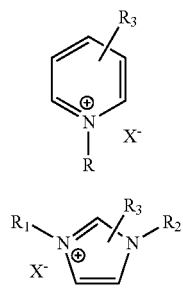

In the formulas A and B; R, $R_1$, $R_2$, and $R_3$ are H, methyl, ethyl, propyl, butyl, pentyl or hexyl group, X is a chloroaluminate. In the formulas A and B, R, $R_1$, $R_2$, and $R_3$ may or may not be the same. In one embodiment the acidic ionic liquid catalyst is N-butylpyridinium chloroaluminate.

In another embodiment the ionic liquid catalyst can have the general formula RR'R"N H$^+$Al$_2$Cl$_7^-$, wherein N is a nitrogen containing group, and wherein RR' and R" are alkyl groups containing 1 to 12 carbons, and where RR' and R" may or may not be the same.

The presence of the first component should give the ionic liquid a Lewis or Franklin acidic character. Generally, the greater the mole ratio of the first component to the second component, the greater is the acidity of the ionic liquid catalyst.

In one embodiment, the acidic ionic liquid catalyst is mixed in the reactor with a hydrogen halide or an organic halide. The reactor can be, for example, an alkylation reactor, an oligomerization reactor, or a combined alkylation and oligomerization reactor. The hydrogen halide or organic halide can boost the overall acidity and change the selectivity of the ionic liquid catalyst. The organic halide can be an alkyl halide. The alkyl halides that can be used include alkyl bromides, alkyl chlorides, alkyl iodides, and mixtures thereof A variety of alkyl halides can be used. Alkyl halide derivatives of the isoparaffins or the olefins that comprise the feed streams in the alkylation process are good choices. Such alkyl halides include, but are not limited to, iospentyl halides, isobutyl halides, butyl halides, propyl halides and ethyl halides. Other alkyl chlorides or halides having from 1 to 8 carbon atoms can be also used. The alkyl halides can be used alone or in combination. The use of alkyl halides to promote hydrocarbon conversion by ionic liquid catalysts is taught in U.S. Pat. No. 7,495,144 and in U.S. patent application Ser. No. 12/468,750, filed May 19, 2009.

It is believed that the alkyl halide decomposes under hydroconversion conditions to liberate Bronsted acids or hydrogen halides, such as hydrochloric acid (HCl) or hydrobromic acid (HBr). These Bronsted acids or hydrogen halides promote the hydrocarbon conversion reaction in the reactor. In one embodiment the halide in the hydrogen halide or alkyl halide is the same as a halide component of the ionic liquid catalyst. In one embodiment the alkyl halide is an alkyl chloride, for example t-butyl chloride. A hydrogen chloride or an alkyl chloride can be used advantageously, for example, when the ionic liquid catalyst is a chloroaluminate.

In one embodiment, when operating in the alkylate mode, the process produces greater than 50 wt % of a $C_5$+ hydrocarbon stream from the process unit that boils at 280° F. (137.8 degree Celsius) or below. In other embodiments, the process can produce greater than 55 wt %, greater than 60 wt %, greater than 70 wt %, greater than 80 wt %, greater than 90 wt % wt % of a $C_5$+ hydrocarbon stream from the process unit that boils at 280° F. (137.8 degree Celsius) or below while operating in the alkylate mode.

In one embodiment, when operating in the distillate mode, the process produces greater than 50 wt % of a $C_5$+ hydrocarbon stream from the process unit that boils above 280° F. (137.8 degree Celsius). In other embodiments, the process can produce greater than 55 wt %, greater than 60 wt %, greater than 70 wt %, greater than 80 wt %, or greater than 90 wt % of a $C_5$+ hydrocarbon stream from the process unit that boils above 280° F. (137.8 degree Celsius).

In some embodiments, the alkylate gasoline blending component can be a low volatility gasoline blending component having a Reid Vapor Pressure of 7.0 psi (4.828e+004 newtons/square meter) or less. In one embodiment the alkylate gasoline blending component has a Reid Vapor Pressure (RVP) less than 4.0 psi (2.758e+004 newtons/square meter). In one embodiment the alkylate gasoline blending component has a Reid Vapor Pressure (RVP) less than 2.8 psi (1.931e+004 newtons/square meter). In other embodiments the alkylate gasoline blending component has a RVP of 2.2 psi (1.517e+004 newtons/square meter) or less, or less than the amount defined by the equation: RVP=−0.035×(50 vol % boiling point, ° C.)+5.8, in psi. The chart of this equation is shown in FIG. 1 in US Patent Publication Number US 20100025292.

In one embodiment, the alkylate gasoline blending component has a high octane number. Examples of high octane numbers are 82 or higher, greater than 85, greater than 90, and greater than 95. In some embodiments, alkylate gasoline blending components having a high octane number are produced by the process unit when it is operating in both the alkylate mode and the distillate mode. In one embodiment, a second C5+ hydrocarbon stream boiling at 280° F. (137.8 degree Celsius) or below, produced in the distillate mode, has a RON greater than 85 (or greater than 90), and a RVP less than 7 (or less than 4).

Different methods are used for calculating octane numbers of fuels or fuel blend components. The Research-method octane number (RON) is determined using ASTM D 2699-07a. RON employs the standard Cooperative Fuel Research (CFR) knock-test engine. Additionally, the Research-method octane number can be calculated [RON (GC)] from gas chromatography boiling range distribution data. The RON (GC) calculation is described in the publication, Anderson, P. C., Sharkey, J. M., and Walsh, R. P., "Journal Institute of Petroleum", 58 (560), 83 (1972).

In one embodiment the process unit additionally comprises a control system that enables the alkylation reactor to be operated in the alkylate mode and a distillate mode, as described previously. The alkylation reactor can easily switch back and forth from operating in the alkylate mode to the distillate mode.

In some embodiments, the process unit additionally comprises a hydrofinishing unit to process one or more products from the reactor. The hydrofinishing unit can process the one or more products from the reactor in one or more steps, either before or after fractionating of the one or more products from the reactor into different fractions having different boiling ranges. The hydrofinishing unit is designed to improve the oxidation stability, UV stability, and appearance of the one or more products from the reactor by removing aromatics, olefins, color bodies, and solvents. A general description of hydrofinishing can be found in U.S. Pat. Nos. 3,852,207 and 4,673,487. The hydrofinishing unit can be used to reduce the weight percent olefins in the one or more products from the alkylating reactor to to less than 10, less than 5, less than 1, or less than 0.5. The hydrofinishing unit can also be used to reduce the weight percent aromatics in the one or more products from the alkylating reactor to less than 0.1, less than 0.05, less than 0.02, or less than 0.01. The hydrofinishing unit can be used to reduce the residual chloride level in the one or more products from the alkylating reactor to less than 100 ppm, less than 50 ppm, less than 10 ppm, or less than 1 ppm.

The term "comprising" means including the elements or steps that are identified following that term, but any such elements or steps are not exhaustive, and an embodiment can include other elements or steps. For the purposes of this specification and appended claims, unless otherwise indicated, all numbers expressing quantities, percentages or proportions, and other numerical values used in the specification and claims, are to be understood as being modified in all instances by the term "about." Furthermore, all ranges disclosed herein are inclusive of the endpoints and are independently combinable. Whenever a numerical range with a lower limit and an upper limit are disclosed, any number falling within the range is also specifically disclosed.

Any term, abbreviation or shorthand not defined is understood to have the ordinary meaning used by a person skilled in the art at the time the application is filed. The singular forms "a," "an," and "the," include plural references unless expressly and unequivocally limited to one instance.

All of the publications, patents and patent applications cited in this application are herein incorporated by reference in their entirety to the same extent as if the disclosure of each individual publication, patent application or patent was specifically and individually indicated to be incorporated by reference in its entirety.

This written description uses examples to disclose the invention, including the best mode, and also to enable any person skilled in the art to make and use the invention. Many modifications of the exemplary embodiments of the invention disclosed above will readily occur to those skilled in the art. Accordingly, the invention is to be construed as including all structure and methods that fall within the scope of the appended claims. Unless otherwise specified, the recitation of a genus of elements, materials or other components, from which an individual component or mixture of components can be selected, is intended to include all possible sub-generic combinations of the listed components and mixtures thereof.

EXAMPLES

Example 1

A sample of N-butylpyridinium chloroaluminate ($C_5H_5C_4H_9Al_2Cl_7$) ionic liquid catalyst was analyzed and had the following elemental composition. The acidic ionic liquid catalyst had aluminum chloride as a metal halide component.

| | |
|---|---|
| Wt % Al | 12.4 |
| Wt % Cl | 56.5 |
| Wt % C | 24.6 |
| Wt % H | 3.2 |
| Wt % N | 3.3 |

Example 2

Gasoline Mode

The acidic ionic liquid catalyst described in Example 1 was used to alkylate $C_4$ olefins with isobutane in a process unit. The alkylation was performed in a continuously stirred tank reactor (CSTR). An 8:1 molar ratio of isobutane to total olefin mixture was fed to the reactor via a first inlet port while vigorously stirring at approximately 1600 RPM. The acidic ionic liquid catalyst was fed to the reactor via a second inlet port, targeting to occupy 6 vol % in the reactor. A small amount of anhydrous t-butyl chloride, corresponding to 60:1 molar ratio of olefin to butyl chloride, was added to the acidic ionic liquid catalyst in the reactor. The average residence time of the combined feeds (isobutane/olefin mixture and catalyst) in the reactor was about four minutes. The outlet pressure was maintained at 200 psig and the reactor temperature was maintained at 15.6° C. (60° F.) using external cooling. The reactor effluent was separated with a coalescing separator into a hydrocarbon phase and an acidic ionic liquid catalyst phase.

A portion of the separated acidic ionic liquid catalyst phase was sent to a catalyst regeneration unit containing aluminum pellets. The catalyst regeneration unit comprised a regeneration reactor that was adjusted within a range from 76.7 to 110° C. (170 to 230° F.) to maintain the conjunct polymer level in the alkylation catalyst from 5 to 10 wt %.

The hydrocarbon phase was then sent to a series of three distillation columns to separate $C_5^+$, n-butane, $C_3^-$ offgas and isobutene recycle streams. The $C_5^+$ stream was analyzed using gas chromatography for detailed hydrocarbon analysis and D86 laboratory distillation. Research Octane number was calculated based on GC composition and Research Octane number of pure compounds assuming volumetric linear blending. The resulting $C_5^+$ stream was an alkylate gasoline having a 95 RON. ASTM D86 distillation of the $C_5^+$ stream showed the initial boiling point of 86° F. (30 degree Celsius), $T_{50}$ boiling point of 223° F. (106.1 degree Celsius), $T_{90}$ boiling point of 284° F. (140 degree Celsius) and the end boiling point of 404° F. (206.7 degree Celsius). These results indicated that the process generated high quality alkylate gasoline that can be readily blended to the refinery gasoline pool.

Example 3

Distillate Mode

Experimental conditions that were nearly identical to those of Example 2 were followed, except that the regeneration temperature was adjusted to allow the conjunct polymer level in the alkylation catalyst to be maintained at a higher level of about 20 wt %.

As in Example 2, the hydrocarbon phase was sent to a series of three distillation columns to separate $C_5^+$, n-butane, $C_3^-$ offgas and isobutene recycle streams. The $C_5^+$ stream was analyzed using the ASTM D2887 SimDist chromatography method. D2887 SimDist results showed $T_{10}$ boiling point of 73° F. (22.78 degree Celsius) (contains some light material), $T_{50}$ point of 343° F. (172.8 degree Celsius), $T_{90}$ point of 648° F. (342.2 degree Celsius) and the end point of 873° F. (467.2 degree Celsius). Weight percent yields of hydrocarbon fuel product streams were estimated using the GC data and results are summarized in Table 1.

TABLE 1

Estimated $C_5^+$ Product Distribution for "Distillate Mode"

| | wt % | vol % | density |
|---|---|---|---|
| Naphtha, C5-280 F. | 34.1 | 36.8 | 0.70 |
| Light distillate, 280 F.-500 F. | 33.2 | 32.6 | 0.77 |
| Heavy distillate, 500 F.-EP | 32.7 | 30.5 | 0.81 |
| Sum, % | 100.0 | 100.0 | |

Results in Examples 1 and 2 demonstrate that for the "Gasoline Mode", essentially all, about 100%, of the $C_5^+$ stream is gasoline boiling range material. For the "Distillate Mode", about 60+ wt % of the $C_5^+$ stream is distillate material boiling in the range of either light distillate (kerosene and jet) or heavy distillate (diesel).

The process unit was operated in the "distillate mode" for one week. Then the used catalyst was drained and fresh catalyst was added to make the conjunct polymer level of the blend alkylation catalyst to be at about 5-10 wt % conjunct polymer. Once the level of conjunct polymer level was reduced to be within about 5 to 10 wt %, the $C_5^+$ stream became lighter boiling range material alkylate gasoline. This change back from "distillate mode" to "alkylate mode" occurred within two days.

Example 4

Product Properties of Alkylate Gasoline and Distillate Using $C_4$ Olefin/Isobutane Feeds in "Distillate Mode"

The $C_5^+$ stream from Example 3 was distillated in a laboratory into gasoline, light distillate (kerosene and jet) and heavy distillate (diesel) fractions. Product properties of each fraction are summarized in Table 2.

TABLE 2

Product Properties of Gasoline and Distillate Streams

| Gasoline Properties | |
|---|---|
| F-1 Research Octane (RON) | 95 |
| F-2 Motor Octane (MON) | 91 |
| Specific Gravity, g/cc | 0.70 |
| Reid Vapor Pressure | 3.6 |
| Sulfur, ppm | 3 |
| Light Distillate Properties, as produced | |
| Flash point, ° F. | ~100 |
| Freeze point, ° F. | <−76 |
| Cloud point, ° F. | <−76 |
| Cetane number | ~30 |
| Bromine number | ~70 |
| Specific Gravity, g/cc | 0.77 |
| Sulfur, ppm | 3 |
| Heavy Distillate Properties, as produced | |
| Freeze point, ° F. | <−76 |
| Cloud point, ° F. | <−76 |

TABLE 2-continued

Product Properties of Gasoline and Distillate Streams

| Cetane number | ~30 |
|---|---|
| Bromine number | ~60 |
| Specific Gravity, g/cc | 0.82 |
| Sulfur, ppm | 18 |

The product property data indicated the process makes very high quality alkylate gasoline with excellent octane numbers, low vapor pressure, and low sulfur.

Additionally, the distillate fractions showed excellent freeze and cloud points indicating these streams can be used to improve the characteristics of kerosene, jet, or diesel blends. The light and heavy distillate fractions showed 60-70 Bromine numbers indicating the fractions contain unsaturated olefins. Thus it can be desirable to send these streams to a hydrofinishing unit to saturate the olefins and to remove any other undesirable impurities or materials.

What is claimed is:

1. A process for making hydrocarbon products, comprising: reacting butene and isobutane with an acidic ionic liquid catalyst, adjusting a level of one or more conjunct polymers in the acidic ionic liquid catalyst between a low level of 10 wt % or less that favors a production of $C_5$+ products boiling at 280° F. (137.8 degree Celsius) or below and a higher level of greater than 10 wt %, that favors a production of both $C_5$+ products boiling at 280° F. (137.8 degree Celsius) or below and $C_5$+ products boiling above 280° F. (137.8 degree Celsius); and wherein the adjusting is done in response to a market demand for different hydrocarbon products.

2. The process of claim 1, wherein the low level is from 5 to 10 wt %.

3. The process of claim 1, wherein the higher level is about 15 wt % or higher.

4. The process of claim 1, additionally comprising controlling a level of a halide containing additive in an alkylation reactor comprising the acidic ionic liquid catalyst.

5. The process of claim 1, wherein the market demand is a seasonal need for an increased amount of alkylate gasoline blending component.

6. The process of claim 1, wherein the $C_5$+ products boiling above 280° F. (137.8 degree Celsius) comprise a light distillate and a heavy distillate.

7. The process of claim 6, wherein both the light distillate and the heavy distillate have a cloud point less than −40° F. (−40 degree Celsius).

8. The process of claim 6, wherein the light distillate and the heavy distillate have less than 20 wppm sulfur.

9. The process of claim 1, wherein the adjusting the level of one or more conjunct polymers to the higher level is done by a) lowering a withdrawal rate of the acidic ionic liquid catalyst from a reactor selected from the group of an alkylation reactor, an oligomerization reactor, or an alkylation/oligomerization reactor, b) lowering a severity of an ionic liquid catalyst regenerator, or c) a combination thereof.

10. The process of claim 1, wherein the higher level favors the production of greater than 50 wt % of C5+ products boiling above 280° F. (127.8 degree Celsius).

* * * * *